April 22, 1969 — A. HEFFTNER — 3,440,108

SEPARATOR FOR STORAGE CELLS AND METHOD OF PRODUCING THE SAME

Filed May 23, 1966

INVENTOR
Arnulf Hefftner
by Michael S. Striker
Attorney

United States Patent Office 3,440,108
Patented Apr. 22, 1969

3,440,108
SEPARATOR FOR STORAGE CELLS AND METHOD
OF PRODUCING THE SAME
Arnulf Hefftner, Hildesheim, Germany, assignor to Robert
Bosch GmbH, Stuttgart, Germany
Filed May 23, 1966, Ser. No. 552,206
Claims priority, application Germany, July 6, 1965,
B 82,703
Int. Cl. H01m 3/04
U.S. Cl. 136—145                 13 Claims

ABSTRACT OF THE DISCLOSURE

A separator for use in storage cells and a method of producing the separator by shaping, compacting and subsequently sintering a mass of particulated thermoplastic material to form a partially finished porous blank having a size corresponding to the combined size of several separators, by subsequently heating selected portions of this blank to melt the material of the selected portions at least in zones adjacent to the exposed surfaces of the selected portions, so that these zones are free of pores and by finally subdividing the blank into a plurality of separators each of which has at least one marginal portion with pore-free zones adjacent to the exposed surface thereof.

---

The present invention relates to separators for storage cells and to a method of producing such separators.

It is already known to produce separators for storage cells by feeding granular or pulverulent thermoplastic material onto a traveling conveyor and by thereupon shaping and compacting such material by means of profiled rollers or the like to form a substantially strip-shaped blank one side of which is provided with parallel ribs. The blank is conveyed through a sintering furnace and is thereby converted into a finished blank which is ready to be subdivided into a plurality of individual separators.

A serious drawback of presently known sintered separators is that their material is too brittle. This results in frequent breakage when the separators are installed in a secondary cell. In order to reduce the likelihood of such breakage, selected portions of the blank are subjected to further treatment subsequent to sintering. For example, it was proposed to provide selected portions of separators with coats of fused thermoplastic material or to subject the separators to repeated hot rolling in order to effect further condensation of their material. Such operations are time-consuming and must be carried out by resorting to expensive equipment which cannot be built into or combined with conventional sintering furnaces. Furthermore, even such aftertreatment of sintered separators cannot prevent uncontrolled breakage or chipping, even if the coating with fused thermoplastic material or repeated hot rolling is carried out with utmost precision. This is due to the fact that the transition between reinforced and brittle portions of the separator is very sudden.

Accordingly, it is an important object of the present invention to provide a novel method of producing separators of sintered thermoplastic material according to which all such portions of a separator which are more likely to break during assembly of a storage cell or in actual use of the cell are reinforced in a very simple, economical and time-saving manner.

Another object of the invention is to provide a method of the just outlined characteristics according to which selected portions of sintered thermoplastic separators may be reinforced at the same rate at which they issue from a conventional sintering furnace.

A further object of the invention is to provide a method according to which the reinforcing operation can be controlled and regulated with utmost precision and by resorting to a very simple, versatile and compact apparatus.

Still another object of the invention is to provide a method of reinforcing selected portions of sintered separators for use in storage cells according to which any desired part of a finished separator or of a blank which is intended to yield two or more separators can be reinforced to exhibit a satisfactory resistance to breakage.

A concomitant object of my invention is to provide a separator for use in storage cells wherein one or more marginal portions are reinforced in accordance with the above outlined method and wherein such reinforcement is brought about without necessitating the application of additional material or repeated condensation of the material of which the separator consists.

A further object of the invention is to provide a separator of the just outlined characteristics wherein the transition between reinforced and non-reinforced portions is gradual so that the likelihood of fissures, internal stresses and similar undesirable phenomena is reduced to a minimum.

Briefly stated, one feature of my invention resides in the provision of a method of producing separators for storage cells which comprises the steps of shaping and condensing a mass of particulate thermoplastic material, such as polyvinyl chloride, to form a strip-shaped blank whose size preferably corresponds to the combined size of several separators, sintering the thus condensed blank in a sintering furnace to convert it into a partially finished porous blank whose particles adhere to each other, subjecting selected portions of such partially finished blank to the action of heat at temperatures at which the material of the selected portions melts, at least in zones adjacent to the exposed surfaces of such selected portions so that the thus fused zones are at least substantially free of pores and are less brittle than the remainder of the partially finished blank, and subdividing the blank into individual separators each of which has at least one marginal portion with substantially pore-free zones adjacent to its exposed surfaces.

The heating step may comprise subjecting selected portions of a freshly sintered partially finished blank to the action of directed jets of a hot gas or subjecting such selected portions to the action of heat which is radiated by infrared lamps or the like. This heating step may be carried out in a plurality of stages, for example, by heating one side of each selected portion in a first operation and by thereupon heating the other side in a second operation.

The novel features which are considered as characteristic of the invention are set forth in particular in the appended claims. The improved separator itself, however, both as to its construction and the mode of producing the same, together with additional features and advantages thereof, will be best understood upon perusal of the following detailed description of certain specific embodiments with reference to the accompanying drawings, in which:

Figure 1:
FIG. 1 is a side elevational view of a separator.
Figure 2:
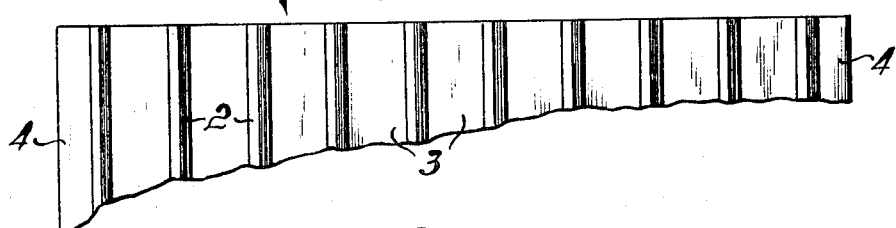
FIG. 2 is a fragmentary top plan view of the separator shown in FIG. 1.

Referring first to FIGS. 1 and 2, there is shown a separator 1 for use in storage cells. This separator consists of sintered polyvinyl chloride and resembles an elongated rectangular strip having a relatively thin base 3 of constant thickness and ten transverse ribs 2 extending from one side of the base. The ribs 2 are parallel to each other and the nine portions or panels of the base between such ribs are porous. The two marginal portions 4 at the longitudinal ends of the separator 1 are reinforced in accordance with the method of my invention and by resorting to apparatus illustrated in FIG. 3 and/or 4. The marginal portions 4 are parallel to each other and to the ribs 2. Save for the method of reinforcing the marginal portions 4, the separator 1 of FIGS. 1 and 2 is produced in the customary way by distributing a mass of granular or pulverulent thermoplastic material on a supporting surface, by thereupon shaping and compacting the thus distributed thermoplastic material by means of suitably profiled rollers or analogous shaping and compressing instrumentalities to form the base 3 and ribs 2, and by thereupon advancing the resulting strip-shaped blank of compacted thermoplastic material through a sintering furnace wherein the particles are caused to adhere to each other and form a partially finished blank whose size preferably corresponds to the combined size of two or more separators. The partially finished blank is thereupon subdivided into individual separators. The size of the separator shown in FIGS. 1 and 2 approximates the size of a separator which can be actually used in a storage cell.

Figure 3:
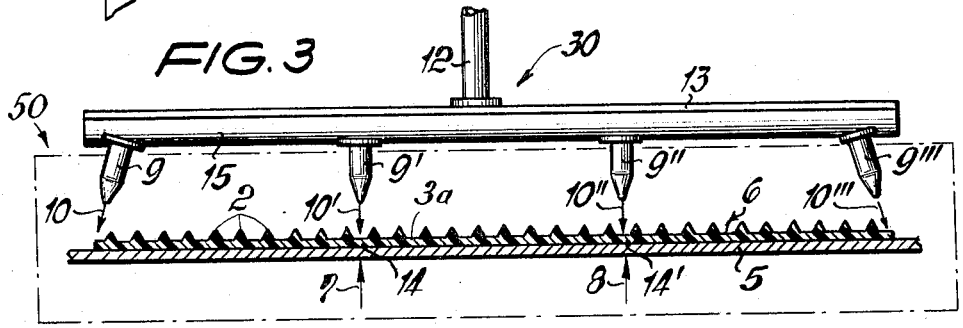
FIG. 3 is a smaller-scale longitudinal section through a separator blank, further showing that portion of the apparatus which is utilized to treat the upper side of the blank.

Referring now to FIG. 3, there is shown an apparatus 30 which may be utilized to reinforce the marginal portions 4 of separators 1 at the rate at which a partially finished blank 6 issues from a conventional sintering furnace 50 indicated by phantom lines. The blank 6 has its base 3a supported on an endless conveyor 5 which advances along an elongated path in a direction at right angles to the plane of and toward the observer facing FIG. 3. The width of the blank 6 equals the combined length of three separators 1, and the arrows 7 and 8 respectively indicate such intermediate portions 14, 14' of the blank which must be reinforced because, after the blank 6 is subdivided into individual separators, each such intermediate portion will be divided into the marginal portions of two adjoining separators 1. Of course, the apparatus 30 of FIG. 3 also treats the marginal portions 4 of the blank 6 because each such marginal portion 4 will yield several marginal portions of individual separators.

The apparatus 30 comprises four nozzles 9, 9', 9", 9''' which direct four jets or four rows of jets 10, 10', 10", 10''' of a hot gas in such a way that the jets impinge against the adjoining portions 4, 14, 14', 4 of the base 3a while the blank 6 travels with the conveyor 5. The nozzles 9–9''' may be closely adjacent to the outlet of the sintering furnace 50 and are carried by a hollow distributor 15 which is immediately adjacent to an electric heater 13 and receives gas through a supply pipe 12. The gas is preferably nitrogen and is heated to a temperature of about 360 degrees. The pressure of gas in the distributor 15, the heating action of the heater 13, the speed of the conveyor 5, the distance of the base 3a from the discharge orifices of the nozzles 9–9''' and the distance of the heating apparatus 30 from the sintering furnace 50 are selected with a view to insure that the jets 10–10''' will fuse such zones of sintered materail which are adjacent to the exposed upper surfaces of the selected portions 4, 14, 14' and 4. The thus fused zones are substantially or completely free of pores and are much more resistant to breakage than the remainder of the blank 6.

Figure 5:
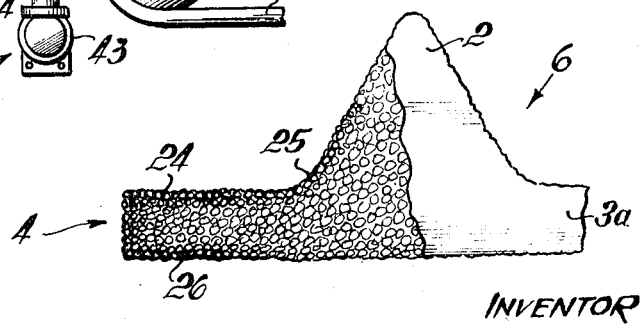
FIG. 5 is a greatly enlarged side elevational view of a marginal portion of a finished blank, this marginal portion being partly broken away to reveal the texture of its material.

FIG. 5 illustrates that the zone 24 of the marginal portion 4 of a treated blank 6 is nearly completely fused. The thickness of the zone 24 may be about 20 percent of the thickness of the base 3a. The jet 10 of the leftmost nozzle 9 is positioned in such a way that the hot gas fuses not only the material of the zone 24 but also the material of the zone 25 at the foot of the adjoining rib 2. Such treatment insures that the transition between the reinforced and non-reinforced zones below the upper surface of the blank 6 is gradual and contributes to greater resistance of the blank to breakage in the regions where the consistency of its material varies. Gradual transition between fused and non-fused zones of the marginal portion 4 shown in FIG. 5 prevents development of internal stresses. It will be seen that the marginal portion 4 of FIG. 5 includes two parts of different thickness, namely, the leftmost part of the base 3a and the adjoining part of the rib 2.

Figure 4:
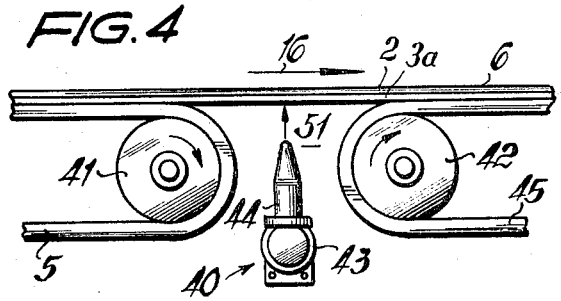
FIG. 4 is a fragmentary side elevational view of the remaining portion of the apparatus which treats the underside of the blank.

For certain purposes, the heating apparatus 30 of FIG. 3 by itself suffices to reinforce the portions 4, 14, 14' and 4 to a desired extent. However, it is equally within the purview of my invention to additionally treat the lower surfaces of the portions 4, 14, 14' and 4 by resorting to a second heating apparatus 40 which is shown in FIG. 4. The two heating apparatus 30 and 40 can be used independently of each other but it is preferred to use such apparatus together so that each of the portions 4, 14, 14' and 4 is treated from both sides at the same rate at which the blank 6 issues from the furnace 50. In FIG. 4, the furnace 50 is assumed to be located to the left of the conveyor 5 which latter is trained around a roll 41 and advances the blank 6 in the direction indicated by arrow 16. The leading end of the blank is caused to move across a gap 51 at the delivery end of the conveyor 5 and onto the upper stringer of a second endless conveyor 45 which is trained around a roll 42. The apparatus 40 further comprises a hollow distributor 43 wherein the gas is heated in the same way as described in connection with the distributor 15 of FIG. 3, and the distributor 43 carries four upwardly extending nozzles 44 (only one shown) each of which heats from the underside the same portion of the blank 6 as one of the nozzles 9–9'''. The blank 6 is self-supporting so that it can travel across the gap 51 without necessitating propping. The temperature of jets issuing from the nozzles 44 is preferably the same as that of jets discharged by the orifices of the nozzles 9–9''', i.e., about 360 degrees if the material of the blank 6 is polyvinyl chloride. FIG. 5 shows that jets of hot gas issuing from one of the nozzles 44 melt a zone 26 which is adjacent to the lower surface of the marginal portion 4. This zone 26 is located opposite the zone 24 and may have the same thickness.

The thickness of fused material in the zones 24, 25 and 26 can be regulated in a very simple way by proper selection of the distance between the sintering furnace 50 and the apparatus 30, 40. The thickness of zones 24–26 will be reduced by placing the apparatus 30, 40 at a greater distance from the furnace, i.e., by allowing for more intensive cooling of the blank 6 before the latter reaches the nozzles 9–9''' and 44.

It is further clear that the apparatus shown in FIGS. 3 and 4 may comprise different types of heating means. Thus, the nozzles 9–9''' and 44 may be replaced by a set of infrared heaters or the like which are positioned to radiate heat against selected portions of the blank 6. Such radiated heat may be focussed upon selected portions of the blank by resorting to suitable deflectors or the like. Electric heaters are preferred in many instances because their heating action may be regulated with utmost precision and because they can be readily transported to and set up at any desired locale where they can receive electrical energy.

The exact construction of the sintering furnace 50 and of the shaping and compacting means for the blank 6 forms no part of the present invention. A very important feature of my invention is believed to reside in the provision of a method and apparatus enabling the manufacturer to reinforce selected portions of separator blanks or individual separators by directed heat without necessitating bodily contact between the separators and the heating instrumentalities. The heating action of such instrumentalities can be rapidly and accurately adjusted to insure optimum treatment of separators by changing the fusing temperature and/or the distance between the heating instrumentalities and the blank.

Another very important advantage of my method resides in that the apparatus utilized for carrying out the method can be readily placed downstream of any presently known sintering furnace for separators without necessitating any alterations in the design and/or operation of the furnace.

A further very important advantage of my method resides in that the step of directing heat against selected portions of sintered material by itself suffices to insure proper resistance to breakage and that such step also results in reinforcement of ribs which are adjacent to such selected portions. The zone corresponding to the one indicated in FIG. 5 by the numeral 25 is particularly likely to break when a blank is treated and its marginal portions reinforced in accordance with heretofore known procedures.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. A method of producing separators for use in storage cells, comprising the steps of shaping and compacting a mass of particulate thermoplastic material to form a strip-shaped blank whose size corresponds to the combined size of several separators; sintering the thus compacted blank to convert it into a partially finished porous blank whose particles adhere to each other; subjecting selected portions of such partially finished blank to the action of heat at temperatures at which the material of said selected portions melts, at least in zones adjacent to the exposed surfaces of such selected portions, so that said zones are at least substantially free of pores; and subdividing the thus finished blank into a plurality of separators each of which has at least one marginal portion with pore-free zones adjacent to the exposed surfaces thereof.

2. A method as set forth in claim 1, wherein said heating step comprises subjecting said selected portions of the partially finished blank to the action of directed jets of a heated gaseous medium.

3. A method as set forth in claim 2, wherein said gaseous medium is nitrogen.

4. A method as set forth in claim 1, wherein said heating step comprises subjecting said selected portions of the partially finished blank to the action of radiated heat.

5. A method as set forth in claim 1, further comprising the step of continuously moving the partially finished blank along an elongated path, said selected portions being heated while the blank is in motion.

6. A method as set forth in claim 5, wherein said heating step comprises heating said selected portions from the opposite sides of the partially finished blank.

7. A method as set forth in claim 5, wherein said selected portions are parallel to each other and extend in the longitudinal direction of said elongated path.

8. A method as set forth in claim 1, wherein said heating step comprises subjecting one side of each of said selected portions to the action of heat at temperatures high enough to fuse the zones adjacent to said one side of each selected portion, and thereupon subjecting the other side of each selected portion to the action of heat at similar temperatures to fuse the zones adjacent to said other side of each selected portion.

9. A method as set forth in claim 1, wherein said shaping step comprises providing one side of said strip-shaped blank with parallel ribs and wherein said selected portions are parallel with such ribs.

10. A method as set forth in claim 9, wherein each of said selected portions includes a portion of at least one rib.

11. As a novel article of manufacture, a separator for use in storage cells, consisting of a single strip of sintered thermoplastic material comprising a thin base and a plurality of ribs extending from one side of said base, the major portion of said strip being porous and said strip having at least one marginal portion whose material is fused as a result of heating to a temperature at which at least such zones which are adjacent to the exposed surfaces of said one marginal portion are substantially free of pores, said one marginal portion including a portion of one of said ribs.

12. A separator as set forth in claim 11, wherein said one marginal portion further includes a portion of said base adjacent to said one rib and wherein the fused zones of said marginal portion merge gradually into the adjoining porous portion of said strip.

13. A separator as set forth in claim 11, wherein said one marginal portion comprises parts of greater and lesser thickness with gradual transition between such parts, each of said parts comprising zones whose material is fused and is therefore substantially free of pores.

References Cited

UNITED STATES PATENTS

| 3,048,537 | 8/1962 | Pall et al. | 264—126 |
| 2,687,445 | 8/1954 | Merrill | 136—145 |
| 2,858,352 | 10/1958 | Solomon | 136—145 |
| 2,866,841 | 12/1958 | Zahn | 136—147 |

ALLEN B. CURTIS, *Primary Examiner.*

D. L. WALTON, *Assistant Examiner.*

U.S Cl. X.R.
136—148; 264—118, 126